United States Patent
Zink et al.

(10) Patent No.: US 10,721,153 B2
(45) Date of Patent: Jul. 21, 2020

(54) METHOD AND SYSTEM FOR INCREASING THROUGHPUT OF A TCP/IP CONNECTION

(71) Applicant: Flash Networks, LTD, Herzliya (IL)

(72) Inventors: Roland Zink, Neu-Anspach (DE); Meiron Tzhori, Kadima (IL); Or Sivan, Tel-Aviv (IL)

(73) Assignee: Flash Networks, LTD, Herzliya (IL)

( * ) Notice: Subject to any disclaimer, the term of this patent is extended or adjusted under 35 U.S.C. 154(b) by 121 days.

(21) Appl. No.: 15/950,157

(22) Filed: Apr. 10, 2018

(65) Prior Publication Data

US 2018/0331932 A1 Nov. 15, 2018

Related U.S. Application Data

(60) Provisional application No. 62/503,395, filed on May 9, 2017.

(51) Int. Cl.
| | |
|---|---|
| *H04L 12/26* | (2006.01) |
| *H04L 12/24* | (2006.01) |
| *H04L 29/06* | (2006.01) |
| *H04L 12/801* | (2013.01) |
| *H04W 28/02* | (2009.01) |

(52) U.S. Cl.
CPC .......... *H04L 43/0888* (2013.01); *H04L 41/08* (2013.01); *H04L 41/083* (2013.01); *H04L 43/0864* (2013.01); *H04L 69/16* (2013.01); *H04L 69/163* (2013.01); *H04L 47/12* (2013.01); *H04W 28/0289* (2013.01)

(58) Field of Classification Search
CPC ... H04L 41/08; H04L 41/083; H04L 43/0864; H04L 43/0888; H04L 47/12; H04L 69/16; H04L 69/163; H04W 28/0289
USPC ........................................................ 370/235
See application file for complete search history.

(56) References Cited

U.S. PATENT DOCUMENTS

| | | | |
|---|---|---|---|
| 2004/0064577 A1* | 4/2004 | Dahlin | H04L 29/06 709/235 |
| 2005/0053002 A1* | 3/2005 | Chan | H04L 47/10 370/235 |
| 2014/0103104 A1* | 4/2014 | Jover | G06F 16/9554 235/375 |
| 2017/0135076 A1* | 5/2017 | Zink | H04W 76/27 |

* cited by examiner

*Primary Examiner* — Mark H Rinehart
*Assistant Examiner* — Kokou R Detse
(74) *Attorney, Agent, or Firm* — Smith Tempel Blaha LLC; Gregory Scott Smith

(57) ABSTRACT

A technique to increase the throughput (TP) of transmission of IP packets over a cellular connection between a mobile device (MD) and a network element (NE) is disclosed. An example embodiment of the disclosed technique starches the time period of the slow start phase of a TCP/IP connection between the MD and the NE. Another example embodiment divides the slow-start phase into two or more slow-start-sub phases. Yet, another disclosed embodiment is configured to add, during the slow-start phase, an extra number of bytes that are embedded in extra-number-of packets (ENoP) wherein the value of the ENoP is decreased when the RTT is increased.

26 Claims, 6 Drawing Sheets

METHOD AND SYSTEM FOR INCREASING THROUGHPUT OF A TCP/IP CONNECTION

CROSS-REFERENCE TO RELATED APPLICATIONS

This utility patent application being filed in the United States as a non-provisional application for patent under Title 35 U.S.C. § 100 et seq. and 37 C.F.R. § 1.53(b) and, claiming the benefit of the prior filing date under Title 35, U.S.C. § 119(e) of the United States provisional application for patent that was filed on May 9, 2017 and assigned the Ser. No. 62/503,395, which application is herein incorporated by reference in its entirety.

FIELD OF THE DISCLOSURE

The present disclosure generally relates to the field of data communication over a packet switch network such as but not limited to an Internet Protocol (IP) network. More particularly the disclosure relates to communicating IP packets over a cellular network such as but not limited to General Packet Radio Service (GPRS), Universal Mobile Telecommunications System (UMTS) or Long-Term Evaluation (LTE) network.

DESCRIPTION OF BACKGROUND ART

Throughput of a download session over a TCP/IP connection is proportional to the size of the congestion window, as long as the congestion window isn't larger than the bandwidth delay product. Wherein the congestion window is the one that is used in that session. TCP stand for Transmission-Control Protocol. IP stand for Internet-Protocol. TCP connection is a reliable connection, which means that a sender of data over a TCP connection may send a group of one or more packets and then waits to get an acknowledgement, from the receiver, indicating that the one or more packets were obtained. When the sender does not received the acknowledgement, for the one or more packets it sent, it will stop and wait. If this wait exceeds a certain time limit, the sender may retransmit those packets. The amount of bytes in that group of packets is referred as the congestion window (CWND).

The transmission rate of a common download session can have a pattern with two phases. The first phase is called a slow-start (SS) phase. The SS phase starts upon initiating the connection. The slow-start algorithm can be used in order to control the transmission rate in an exponential growth. The second phase can be referred as congestion avoidance (CA) phase. In CA phase a linear growth algorithm can be used.

In a common SS, the CWND is set to a small number of bytes. The value of the CWND will be increased by one maximum segment size (MSS) with each received acknowledgement (ACK). Thus, after receiving the ACK for the last packet in a CWND, the value of the CWND is effectively doubled, reflecting an exponential growth. The SS phase continues until a slow-start threshold (SST) is reached or a loss is detected. Then, the transmission rate is changed to linear-growth algorithm, which can be referred as CA algorithm. An example of linear-growth algorithm may add a fixed number of bytes per each round-trip time (RTT). An example of such an amount can be the number of bytes that is defined by the MSS. In the present disclosure the terms packet and segment can be used interchangeably. In some cases, during the life time of the connection, when the value of the CWND decreases below the SST, then the SS phase algorithm can be used again.

The throughput (TP) over a certain connection is mostly proportional to the size of the CWND and is mostly inverse proportional to the smooth-round-trip time (SRTT) over that connection. The SRTT is an average value based on two or more measured RTTs. Thus, the TP can be estimated by dividing the value of the CWND by the value of the SRTT. In order to increase the TP a sender needs to increase the CWND, however increasing the CWND will produce a larger SRTT. In addition, too high CWND or too high SRTT may lead to packet loss.

Indication on packet loss may reach the sender after a delay which may postpone the reaction of the sender and may increase the amount of packet loss. Increasing the amount of packet loss may reduce the TP over the connection. Thus, the TP over a connection depends on two conflicting factors, which require a method for defining optimal values for those conflicting factors. In the following description and the claims, the term "RTT" and "SRTT" may be used interchangeably.

BRIEF SUMMARY

The needs and the deficiencies that are described above are not intended to limit the scope of the inventive concepts of the present disclosure in any manner. The needs are presented for illustration only. The disclosure is directed to a novel technique for increasing the TP of a download session of a mobile device over a cellular network such as but not limited to GPRS, UMTS or LTE network.

An example embodiment of the present disclosure can be implemented by a TCP sender. An example of TCP sender can be a Network Element (NE) located in a mobile Access-Network-Operator Premises (ANOP) in between an access gateway (AGW) and an Internet-Network Gateway (I-GW), etc. An example of an AGW for an LTE network can be a packet GW (P-GW). Another example embodiment of a NE can be a TCP proxy located between one or more TCP senders and one or more TCP receivers. An example of TCP sender can be a TCP Internet server and an example of TCP receiver can be a mobile device (MD).

For the purposes of simplicity and readability the present disclosure relates in more details to an LTE access network as an example of an access network, however a person having an ordinary skill in the art can adapt the disclosed technique to other type of access networks.

An example embodiment of NE can be configured to maintain an optimal TP over a TCP/IP connection. Maintaining the optimal TP can be done by increasing the time period of the SS phase of that TCP connection, for example. An example embodiment of the present discloser can be configured to increase the time period of the SS phase by defining a higher value for the SS threshold (SST). The higher value of the SST enlarges the period of time in which the transmission rate is increased in exponential rate. In order to avoid packet loss during the longer SS phase, an example embodiment of the novel NE may divide the SS phase into two sub-phases: SS1 and SS2. Other embodiments may divide the SS phase into three or more sub-phases.

During SS1, each time an ACK per a packet is obtained, an example embodiment of the novel NE can send two packets, which means that after obtaining the ACK from the last packet of a certain CWND, the value of the last CWND (LCWND) is double the value of the CWND, which was used when the transmission of the first packet of that group was sent (FCWND) LCWND=2×FCWND. During SS2, each time an ACK per packet is obtained, an example embodiment of the novel NE can send an average of 1.5 packets, which means three packets after two ACKs. An example embodiment of NE may send a sequence of 1; 2; 1; 2; 1; 2 . . . packets in order to get 1.5 packets per each ACK. Thus, during SS2 the LCWND=1.5×FCWND.

Consequently, an example embodiment of the novel NE may use two different exponential coefficients, 2 and 1.5, during the SS phase. Other example embodiments of NE may use other exponential coefficients, 2 and 1.25, for example.

The point in time, in which an example of NE may switch from SS1 to SS2, can be referred as the Pivot Point (PP). An example embodiment of NE may switch to SS2 when the measured SRTT is equal or greater than the value of PP. The value of the PP can be based on the value of the minimum RTT (MinRTT), which was measured when the cellular connection between the NE and the relevant mobile device (MD) was established. This value can be referred as MinRTT. In some embodiments of present technique, when the current calculated value of the SRTT is smaller than the used MinRTT, then the value of the MinRTT can be set to be equal to the value of the current SRTT.

The value in time in which the NE switches from SS phase to CA phase can be referred as MaxRTT. Some embodiments of the novel NE may define the value of the MaxRTT by running a plurality of experiments in which the CWND is increased while measuring the RTT. The value of the RTT, above which the values of the RTTs are increased rapidly or a packet lost is detected, can be defined as the MaxRTT. We found that the value of the MaxRTT can depend on the type of the cellular network 3G, 4G, etc. Some embodiments of the present disclosure may calculate the value of PP based on time measurements versus the value of the CWND.

Next, an example embodiment of NE may calculate the value of the PP according to the following formula: PP=MaxRTT×(1−MinRTT:K) wherein K is a factor that depends on the type of the cellular networks. The value of K can be found by a plurality of measurements or by running a plurality of simulations in which the value of K can be varied between 30 to 90 milliseconds, for example. It was found that the value of K=60 milliseconds fits the behavior of the transmission rate over an LTE network.

Some embodiments of NE may limit the value of PP to be in between the value of MaxRTT and the value of 0.33 MaxRTT. Consequently, an example of NE may enforce three phases along a TCP connection over a cellular network: SS1, SS2 and CA phase. Such an example of NE may calculate the value of PP for moving from SS1 to SS2 by a formula such as but not limited to:

$$PP=MaxRTT\lambda(1-MinRTT:60).$$

Other example embodiments of the present disclosure may use other method to maintain an optimal TP over a TCP connection. It was found that an optimal TP over a TCP/IP connection can be achieved when the number of packets that are sent during the SS phase is increased (per each received ACK) by extra number of packets (ENoP), wherein the ENoP can be calculated by a formula such as but not limited to:

$$ENoP=L*(1-\text{current RTT:MaxRTT}).$$

It was found that the value of L can be in the range of 2-3. An example value of L can be 2.4. At the point of time that the value of ENoP is equal or smaller than zero the sender can switch to CA phase. By using this method an example of NE can increase its CWND by the value of bytes that are carried by the extra number of packets, ENoP. Thus, the value of a new CWND can be equal to the previous CWND plus the number of bytes carried by the ENoP.

During a long TCP/IP session an example embodiments of NE may repeat the SS process once in a while in order to adapt the transmission rate to the current condition over the connection.

The foregoing summary is not intended to summarize each potential embodiment or every aspect of the present invention, and other features and advantages of the present invention will become apparent upon reading the following detailed description of example embodiments with the accompanying drawings and appended claims.

Furthermore, although specific exemplary embodiments are described in detail to illustrate the inventive concepts to a person skilled in the art, such embodiments can be modified to various modifications and alternative forms. Accordingly, the figures and written description are not intended to limit the scope of the inventive concepts in any manner.

Other objects, features, and advantages of the present invention will become apparent upon reading the following detailed description of the disclosed embodiments with the accompanying drawings and appended claims.

BRIEF DESCRIPTION OF THE DRAWING

Exemplary embodiments of the present disclosure will be understood and appreciated more fully from the following detailed description, taken in conjunction with the drawings in which.

DETAILED DESCRIPTION OF VARIOUS EMBODIMENTS

Turning now to the figures in which like numerals represent like elements throughout the several views, in which exemplary embodiments of the present disclosure are described. For convenience, only some elements of the same group may be labeled with numerals. The purpose of the drawings is to describe exemplary embodiments and not for production. Therefore features shown in the figures are chosen for convenience and clarity of presentation only. Moreover, the language used in this disclosure has been principally selected for readability and instructional purposes, and may not have been selected to delineate or circumscribe the inventive subject matter, resort to the claims being necessary to determine such inventive subject matter.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments may implement the features and functionality described herein in software, firmware, or hardware as desired, including any combination of software, firmware, and hardware.

In the following description, the words "unit," "element," "module" and "logical module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware, ultimately resulting in one or more processors programmed to execute the functionality ascribed to the unit or module. Additionally, multiple modules of the same or different types may be implemented by a single processor. Software of a logical module may be embodied on a computer readable medium such as a read/write hard disc, read-only memory (ROM), compact-disc ROM (CDROM), Flash memory, or other memory or storage devices, etc. In order to execute a certain task a software program may be loaded from a memory device to an appropriate processor as needed. In the present disclosure the terms task, method, process can be used interchangeably. In the present disclosure the verbs transmit, transfer or be placed in a queue can be used interchangeably. Packets that are placed in a queue are sent as soon as possible.

Figure 1:
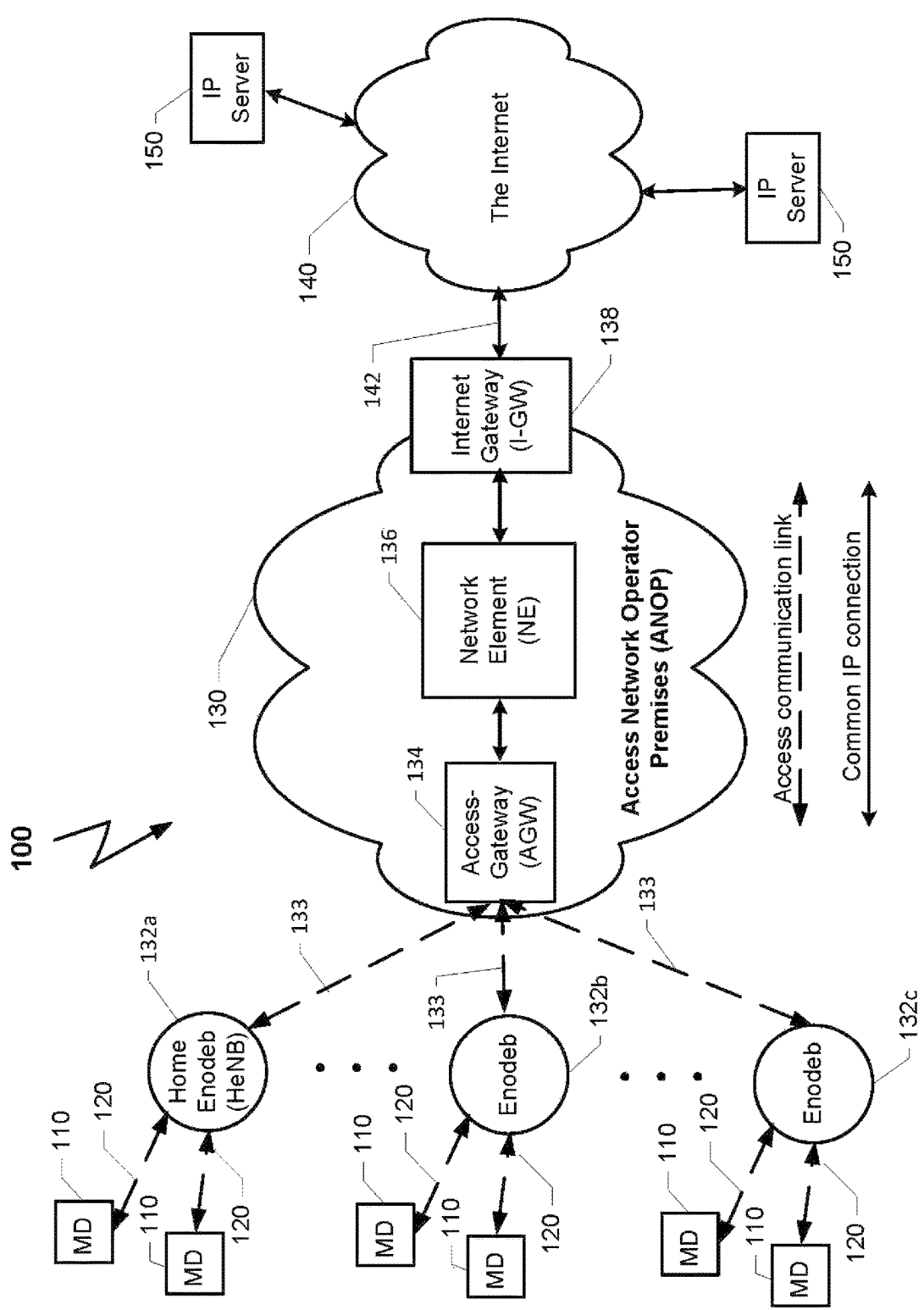
FIG. 1 illustrates a block diagram with relevant elements of an example Access Network Operator Premises (ANOP) in which an embodiment of the present disclosure can be implemented.

FIG. 1 depicts a block diagram with relevant elements of an exemplary communication system 100 in which an exemplary embodiment of the present disclosure can be implemented. Communication system 100 can be configured to handle data-packet traffic over TCP/IP network, for example. Communication system 100 can comprise an Access Network Operator Premises (ANOP) 130, a plurality of mobile-devices (MDs) 110, a plurality of intermediate nodes 132a-c, the Internet 140, and one or more IP servers 150. The intermediate nodes 132a-c can comprise: Home Enodeb (HeNB) 132a; and Enodeb 132b&c, for example.

The ANOP 130 can be connected to the Internet 140 via an Internet-gateway (I-GW) 138 and a communication link 142. An example of ANOP 130 can be the access network of a GPRS cellular operator, LTE cellular operator, etc.

A few non-limiting examples of typical mobile-devices (MDs) 110 can be: a laptop, a mobile phone, a PDA (personal digital assistance), a smart phone, a tablet computer, one or more type of sensors, connected vehicles, Internet-of-Things (TOT), etc. A smartphone is a mobile phone with an advanced mobile operating system that combines features of a personal computer operating system with other features useful for mobile or handheld use. Each MD 110 may employ a browser application. Following are few not limiting examples of browser applications: Firefox (a trade name of Mozilla), Apple-Safari (a trade name of Apple Inc.), Google-Chrome (a trade name of Google Inc.), etc.

An MD 110 can be connected to an access gateway (AGW) 134 via intermediate nodes such as Enodeb 132b&c or Home enodeb (HeNB) 132a and a backhaul network 133. A non-limiting example of an AGW 134 can be an S-GW or P-GW. Along the disclosure and the claims the term AGW and S-GW can be used interchangeably. The connection between an MD 110 and the intermediate nodes 132a-c can be implemented by cellular links 120.

An ANOP 130 can provide different services to a plurality of MDs 110. Few non-limiting examples of services provided by the ANOP 130 can include: spam filtering, content filtering, bandwidth consumption, distribution, transcoding, rating adaptation, power saving etc. Among other elements an example ANOP 130, which is configured to implement an example embodiment of the disclosed technique, may comprise one or more AGW 134 such as but not limited to S-GW, a NE 136, and Internet gateway (I-GW) 138. In other embodiment of the disclosed technique (not shown in the figures), an embodiment of a NE 136 can be installed over the communication link 142 between the I-GW 138 and the Internet 140, for example. Another example embodiment of a NE 136 (not shown in the figures) can be a TCP proxy located between one or more IP servers 150 and one or more of the MDs 110.

Among other tasks, an example of AGW 134 can be configured to identify a requesting MD 110 at its ingress to the ANOP 130, to process the data traffic to or from the plurality of MDs 110 via the one or more intermediate nodes 132a-c. In the direction from the MD 110 toward the internet 140, the AGW 134 can be configured to transfer IP traffic toward the NE 136. An example AGW 134 can be an S-GW for an LTE network, another example of AGW can be P-GW. The AGW 134 can be configured to identify the subscriber and accordingly can determine whether the subscriber is allowed to get the required access to the network and what services the subscriber is entitled to receive, for example. In addition, the AGW 134 may participate in a process of allocating one or more public IP addresses to the requesting MD 110 to be used during the current access session.

In some embodiments of system 100 the AGW 134 can be configured to handle the mobility management of MDs 110 and can carry out the signaling channel over the backhaul network 133 for paging and mapping each MD 110 to its currently associated Enodeb 132a-c. The I-GW 138, at the other side of ANOP 130, can be a router, for example. The I-GW can route IP data packets to and from the plurality of IP servers 150 via the Internet 140. The communication between the I-GW 138 and the Internet 140 can be based on Internet protocol (IP).

Among other tasks, example embodiments of NE 136 can be configured to increase the throughput (TP) over a certain TCP connection between the MDs 110 and at least one IP server 150. An example embodiment of NE 136 can be configured to increase the TP over a certain connection by increasing the time period in which the transmission rate is increased in exponential rate. In order to avoid packet loss during the longer SS phase, an example embodiment of the novel NE 136 may divide the SS phase into two sub-phases: SS1 and SS2. Other embodiments may divide the SS phase into three or more sub-phases. In each SS sub-phase (SS1, SS2, for example) a different exponential coefficient can be used. The point in time in which an example of NE 136 switches from SS1 to SS2 can be referred as the Pivot Point (PP).

In some embodiments of NE 136 during SS1 the exponential coefficient can be two. During SS2 the exponential coefficient can be 1.5. Other embodiments may use other exponential coefficients. More information on the operation of such an example of NE 136 is disclosed below in conjunction with FIGS. 2, 3A and 3B.

Other example embodiments of NE 136 can be configured to increase the number of packets that are sent over a connection between an IP server 150 and an MD 110 by adding the number of bytes that are carried by an extra number of packets (ENoP). Wherein, the ENoP is calculated by multiplying a coefficient "L" by the value of one minus the value RTT divided by the value of MaxRTT. It was found that the value of L can be in the range of two to three. An example value of L can be 2.4. Some embodiments may use the value of SRTT instead of the value of RTT.

$$ENoP=L*(1-RTT:MaxRTT)$$

Thus, some embodiments of the present disclosure may calculate the amount of packets to be sent based on time measurements versus measuring the amount of bytes that were sent without obtaining an ACK. More information on the operation of such an example of NE 136 is disclosed below in conjunction with FIG. 2 and FIG. 4.

Figure 2:
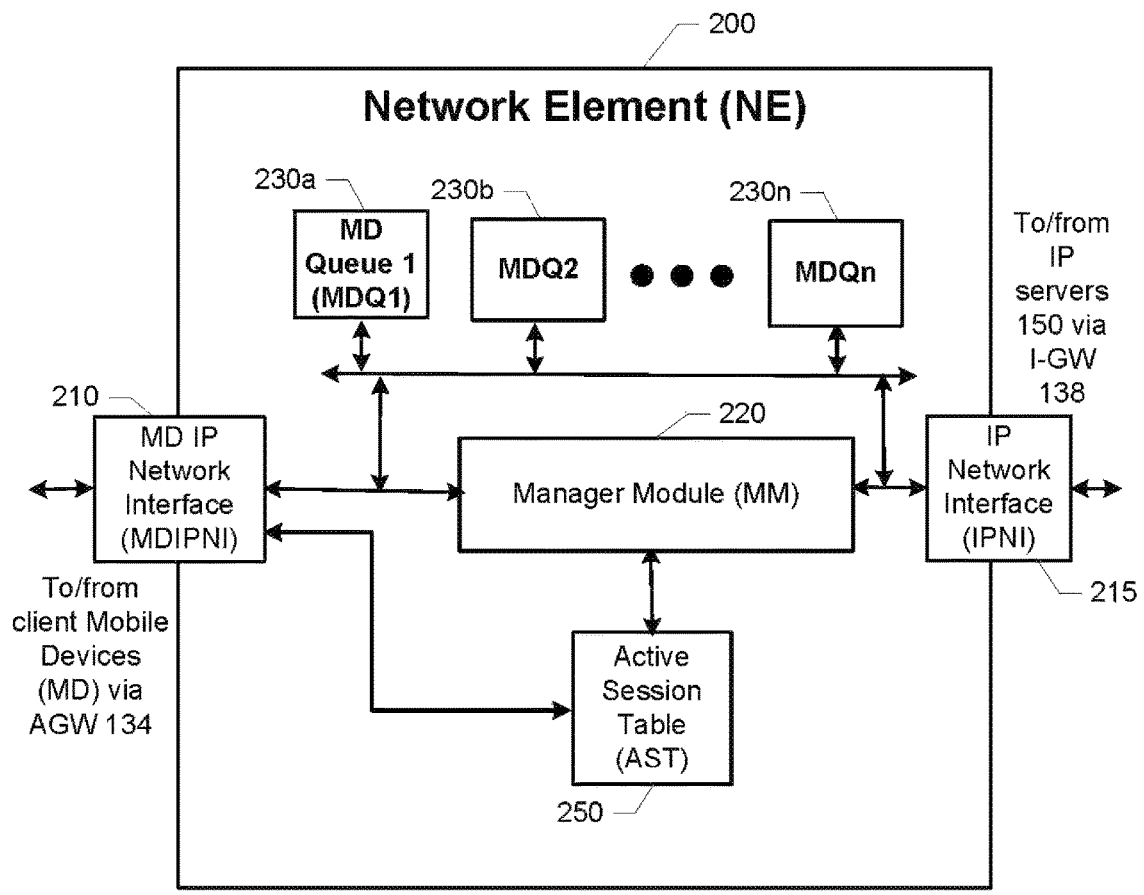
FIG. 2 illustrates a block diagram with relevant elements of an example of a Network Element (NE), according to the teaching of the present disclosure.

FIG. 2 depicts a block diagram with relevant elements of an example embodiment of NE 200. An example embodiment of NE 200 may comprise one or more processors, computer readable medium such as but not limited to a read/write hard disc, CDROM, Flash memory, ROM, etc. Software of a logical module may be embedded on one of the computer readable medium. In order to execute a certain task, a software program may be loaded to an appropriate processor as needed.

An example of an NE 200 can comprise few logical modules such as but not limited to a Manager-Module (MM) 220; an active session table (AST) 250, which is stored in a memory device; an MD IP network interface (MDIPNI) 210; one or more queues, MDQ1 to MDQn 230a-n; and IP network interface (IPNI) 215, for example. Each queue 230a-n can be stored in one or more memory devices or all the queues can be stored in the same memory device. In the disclosed embodiment each MDQ 230a-n can be associated with one MD of the plurality of MDs 110 (FIG. 1).

An example of MDIPNI 210 can comprise one or more processors, state machines, etc. MDIPNI 210 can be configured to obtain IP packets from MD 110 via the AGW 134 (FIG. 1). In addition, MDIPNI 210 can parse the obtain packets and based on the header of the packet, the MDIPNI 210 can define the session to which the packet belongs. A session can be identified by the destination and source IP addresses and ports that are used during establishing that session, thus the destination is one of the IP servers 150 (FIG. 1) and the source is one of the MDs 110. Other embodiments may use other session detection methods. Based on the session identification, the AST 250 can be searched looking for an entry that is associated with that session. If an entry does not exist, then the MDIPNI 210 may determine whether the packet is a SYN. packet, which means that the session is a new one. If yes, then the MDIPNI 210 can allocate an entry for the new session in the AST 250. Next, the relevant fields of that entry can be updated. Fields such as but not limited to destination and source IP addresses and ports number; an indication on one of the MDQ 230a-n that was allocated to that session; domain name. If the packet is not a SYN. then the packet can be thrown away.

If an entry exists in the AST then the data in that entry can be parsed and the packet can be transferred by MDIPNI 210 toward the relevant MDQ 230a-n. In addition the relevant entry can be updated with the appropriate information. Information such as the obtaining time of the packet, etc. Then, the packet or a pointer to the packet can be transferred toward the queue of the MM 220 and a trigger can be sent to the MM 220. In an alternate embodiment, if an entry, in AST 250, does not exist, then the MDIPNI 210 may transfer the packet to the queue of the MM 220 and sent a trigger to the MM 220. In such embodiment the MM 220 can be configured to implement a process which is similar to the process that was disclosed in the above paragraph in conjunction with MDIPNI 210.

Some embodiments the MDIPNI 210 can be configured to increase the TP over the connections with one or more MDs 110 (FIG. 1). In such embodiment, an example of MDIPNI 210 can be configured to execute one or more tasks that are related to defining the different phases (SS1, SS2, SST, CA), defining the values of MinRTT, MaxRTT; PP; SRTT; ENoP; CWND; etc.

IP packets obtained from IP servers 150 via the I-GW 138 (FIG. 1) can be parsed by IPNI 215. Based on the header of the packet, the IPNI 215 can define the session to which the packet belongs. Then, the AST 250 can be searched looking for an entry that is associated with that session. Based on the found entry the packet can be transferred toward the relevant queue MDQ 230a-n; and the relevant entry of the AST 250 can be updated with information such as the address in the relevant MDQ 230a-n in which the packet was stored, the obtaining time, etc. Then, a trigger can be sent to the MM 220. In addition to the above disclosed tasks, some embodiments of IPNI 215 can be configured to execute common tasks of TCP/IP interface module. Tasks such as but not limited to sending an ACK message toward the relevant IP server 150 (FIG. 1) per each obtained packet from the IP servers, or waiting to obtain an ACK message from an IP server per each transmitted request, etc.

An example of MM 220 can comprise one or more processors, state machines, registers; internal clock, etc. The clock for the different timers can be one millisecond, for example. An example of MM 220 can be configured to manage the entire operation of the NE 200. During initiation, MM 220 can allocate the computing and the storage (memory volume) resources per each module of NE 200. In some embodiments the MM 220 can be further configured to handle new sessions that are not recorded in the AST 250. In such embodiment, an example of MM 220 can be configured to execute one or more tasks that are disclosed in conjunction with MDIPNI 210. Those tasks nay comprise tasks related to defining the different phases (SS1, SS2, SST, CA), tasks relating to defining the values of MinRTT, MaxRTT; PP; SRTT; ENoP; CWND; etc. More information on the operation of an example of MDIP 210, or MM 220 is disclosed below in conjunction with FIGS. 3A, 3B, 4A and 4B.

Figure 3A:
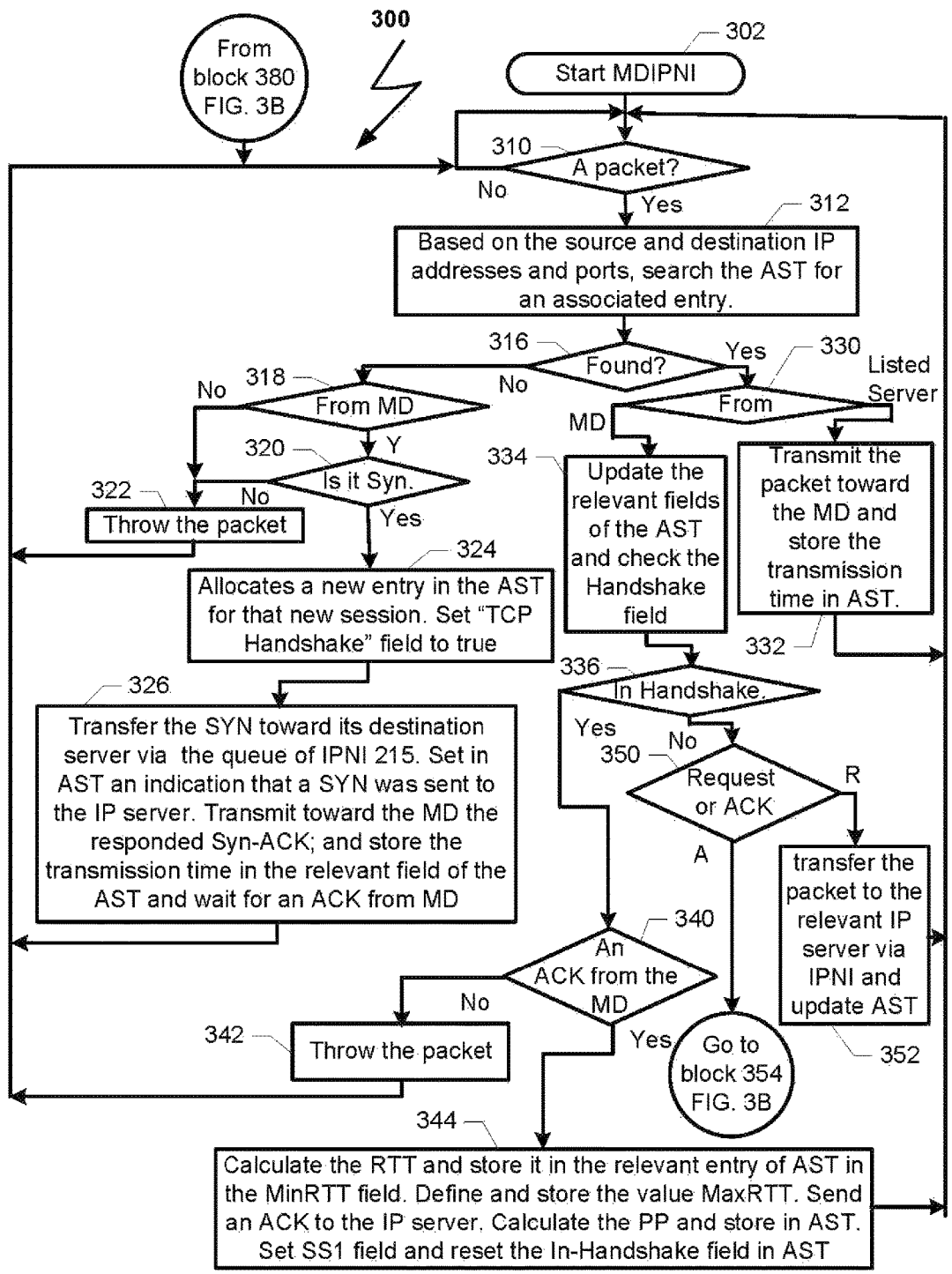
FIGS. 3A and 3B illustrate a flowchart with relevant actions of an example process for increasing the TP over a cellular connection that can be implemented by an example of MDIPNI 210 (FIG. 2), of an NE.
Figure 3B:
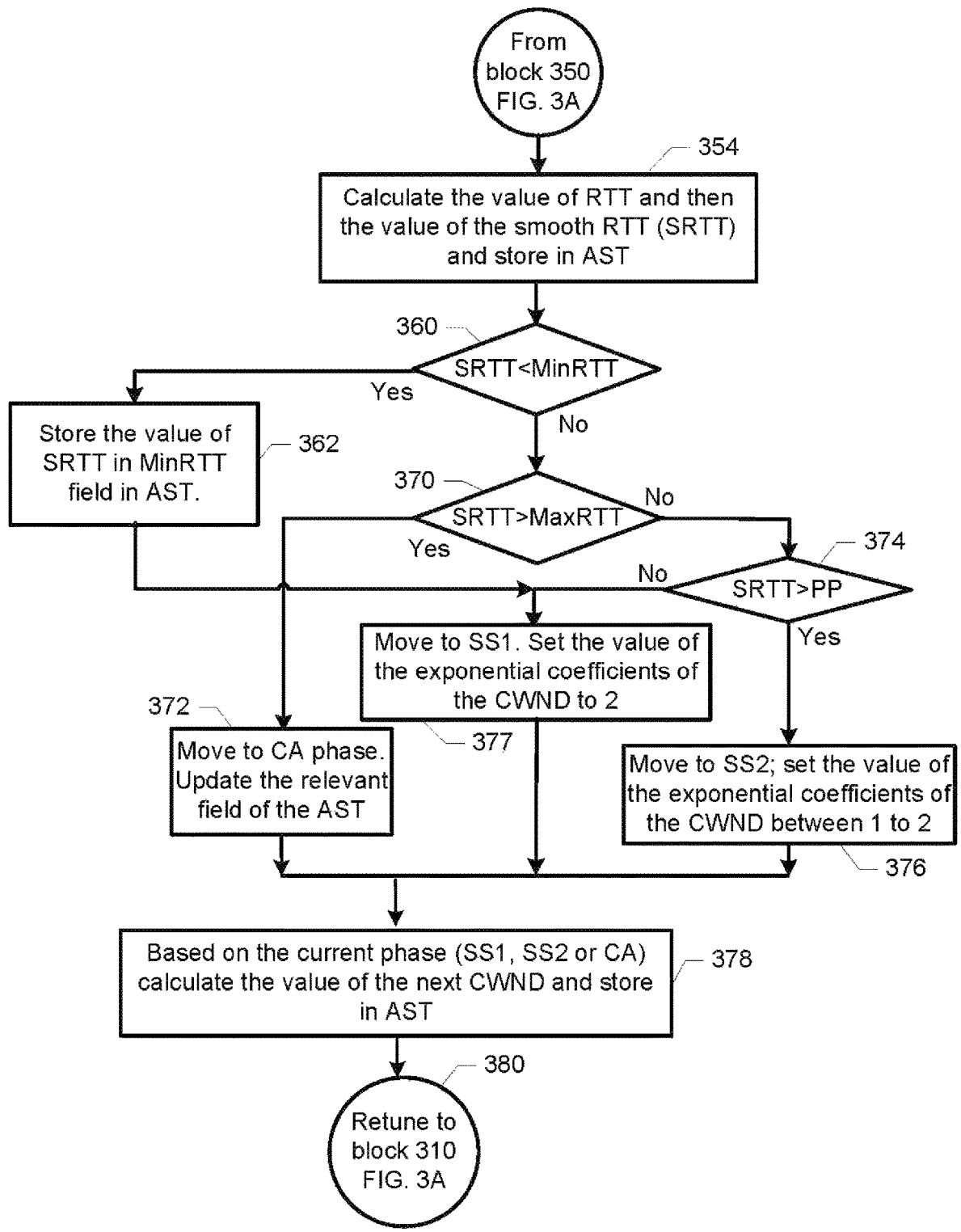

FIGS. 3A and 3B illustrate a flowchart with relevant actions of an example process 300 that can be implemented by an example MDIPNI 210 (FIG. 2), of an NE 200, for increasing the TP during a downloaded session from a web server 150 (FIG. 1) to an MD 110. In general, the example process 300 stretches the SS period. The process can be initiated 302 after power on and be executed as long as the NE 200 is active. Upon initiation 302 resources for handling the disclosed method can be allocated. Resources such as but not limited to storage resources for the AST 250, timers for monitoring the RTT, registers, computing resources, networking resources, etc. After allocating the resources process 300 may wait 310 for a packet.

Upon obtaining 310 a packet or a pointer to a packet that is stored in one of the queues 230a-n (FIG. 2), the header of the packet can be parsed 312 and based on the source and destination IP addresses and ports the AST 250 (FIG. 2) can be searched for an entry that is associated with this session. If 316 an entry was not found, then a decision is made 318 whether the packet was obtained from an MD 110 (FIG. 1). If 318 the packet was not obtained from one of the MDs, then the packet is thrown away 322 and process 300 returns to block 310 waiting for the next packet. If 318 the packet was obtained from one of the MDs 110 (FIG. 1) then at block 320, based on parsing the packet, a decision is made whether the packet carries a SYN message. If 320 not, then the packet is thrown away 322 and process 300 returns to block 310 for handling the next packet.

If 320 the packet carries a SYN message, indicating that the relevant MD 110 (FIG. 1) is willing the start a new session, then at block 324 a new entry in AST 250 is allocated for that new session. The relevant fields of the new entry can be updated with information related to that session. Information such as but not limited to source and destination IP addresses and ports, the obtaining time, etc. In addition a field that is related to "TCP Handshake" can be set to "true", indicating that the relevant MD is in a process for establishing a new TCP session with that IP server.

Next, at block 326 the SYN. packet is transferred toward its destination server via the queue of IPNI 215 (FIG. 2) and an indication for sending the SYN packet can be written in the relevant entry in the AST. In addition, a packet that carries a responded SYN-ACK message can be sent toward the relevant MD via MDIPNI 210. The transmission time of sending the SYN-ACK can be stored in the relevant field of the allocated entry in AST 250. Then, the field of the SS1 phase is set to true and process 300 returns to block 310 waiting for a packet that carries an ACK message from the relevant MD 110 (FIG. 1).

Returning now to block 316, if an entry was found, then in block 330 a decision can be made whether the packet was obtained from one of the MDs 110 (FIG. 1) or whether the packet was obtained from one of the listed IP servers 150 (FIG. 1) via MM 220 (FIG. 2) or via IPNI 215. The "listed IP servers" is a subgroup from the plurality of IP servers 150 (FIG. 1) that are currently listed in the AST 250 as having an active download session with one of the MDs 110. The list of the active servers 150 can be retrieved from the AST 250. If 330 the packet was obtained from one of the listed IP servers 150 (FIG. 1), then the relevant entry in the AST 250 can be updated and the packet is queued 332 toward the relevant MD 110 (FIG. 1). When the CWND allows, the queued packet can be transmitted 332 toward the relevant MD 110 and the transmission time can be stored in the relevant entry in AST. Then, process 300 may return to block 310 waiting to the next packet. The relevant entry in AST 250 can be defined by the source and destination IP addresses and IP ports, for example. In some embodiments the entry can be define by a value of a session ID.

If 330 the packet was obtained from one of the MDs 110, then at block 334 the relevant fields of the associated entry can be updated and the "TCP-Handshake" field can be checked 334. If 336 the "TCP-Handshake" field is true, indicating that the state of the TCP connection is in "TCP-Handshake" state, then at block 340 a decision is made whether the packet carries an ACK message from the relevant MD. If 340 not, then at block 342 the packet is thrown away and process 300 returns to block 310 for handling the next packet.

If 340, the packet carries an ACK message from the relevant MD, then at block 344 the RTT, from the NE 136 to the relevant MD 110 and back, can be calculated and stored in the relevant entry of the AST in the MinRTT field. Based on the type of the cellular network (3G, 4G, LTE, etc.) the value of the MaxRTT can be written in the relevant field of that entry and the ACK packet can be sent toward the relevant IP server 150. In addition the value of the PP can be calculated and be stored in the relevant field of that entry and the SS1 field can be set to true. Finally, the "TCP-Handshake" field in the relevant entry is reset and process 300 returns to block 310 for handling the next packet.

An example embodiment of process 300 can define 344 the value of the MaxRTT by running a plurality of experiments in which the CWND is increased while measuring the RTT. The value of the RTT, above which the values of the RTTs are increased rapidly, can be defined as the MaxRTT. The plurality of experiments can be done at the ANOP 130 (FIG. 1) after the installation of an example embodiment of NE 136 (FIG. 1). Other embodiments may continue to increase the CWND until a packet lost is detected, and then define the measured RTT, which was measured before the packet lost, as MaxRTT. We found that the value of the MaxRTT can depend on the type of the cellular network 3G, 4G, etc. Thus, some embodiments of the present disclosure may calculate the value of PP based on time measurements versus the value of the CWND.

An example embodiment of NE 136 (FIG. 1) may use the following formula in order to calculate the value of PP: PP=MaxRTTλ(1−MinRTT:K) wherein K is a factor that depends on the type of the cellular networks. The value of K can be found by a plurality of measurements or by running a plurality of simulations in which the value of K can be varied between 30 to 90 milliseconds, for example. It was found that the value of K=60 milliseconds fits the behavior of the transmission rate over an LTE network. Some embodiments of NE may limit the value of PP to be in between the value of MaxRTT and the value of 0.33 MaxRTT, for example.

If 336 the "TCP-Handshake" field is not true, then a decision is made 350 whether the packet carries a request, to be sent toward one of the IP servers 150 (FIG. 1), or carries an ACK message toward the relevant IP server 150 (FIG. 1). If 350 the packet carries a request (R), then the request packet is transferred 352 toward the relevant IP server via IPNI 215 (FIG. 2) and an ACK message is transmitted toward the relevant MD 110 (FIG. 1). Next, the relevant entry in the AST can be updated or released, in case that the packet is the last packet of the session. Then, process 300 returns to block 310 for handling the next packet. If 350, the packet carries an ACK message (A), then process 300 proceed to block 354 (FIG. 3B) and calculates the value of RTT. Then the value of the SRTT can be updated and be stored in the relevant field of that entry in AST 250. Some embodiments may calculate the value of SRTT as an average value based on two or more measured RTTs.

After updating the value of the SRTT the updated value is compared 360 to the value of MinRTT that is stored in that entry. If 360 the value of SRTT is smaller than the value of MinRTT, then the value of SRTT can be stored 362 in the MinRTT field of that connection and process 300 proceed to block 377. If 360 the value of SRTT is not smaller than the value of MinRTT, then at block 370 the value of the SRTT is compared to the value of the MaxRTT. If 370 SRTT is greater than the value of MaxRTT, then the phase of the transmission rate can be changed 372 to congestion avoidance (CA) phase. The cell at the junction of the relevant entry of AST 250 (FIG. 2) and the SS2 column is set to false and the cell at the junction of the relevant entry and the CA column is set to true and process 300 proceed to block 378. In addition relevant fields in the relevant entry can be updated. Fields such as but not limited to the fields that are associated with SS phase can be reset and process 300 can proceed to block 378.

If 370 the value of SRTT is not bigger than MaxRTT, then at block 374 the value of SRTT is compared to the value of the calculated PP and a decision is made 374 whether the value of SRTT is bigger than the value of PP. If 374 yes, then the transmission phase is changed 376 to SS2 and the value of the exponential coefficient for calculating the CWND is set to a preconfigured value that is in between one to two, 1.5 or 1.25 for example. The preconfigured value can be retrieved from the relevant entry in the AST. The new value of the exponential coefficient can be stored in the AST and process 300 proceeds to block 378.

If 374 the value of SRTT is not bigger than the value of PP, then at block 377 the value of the transmission phase is set to SS1 and the exponential coefficient for calculating the CWND can be set to two and process 300 proceed to block 378. In block 378 based on the current transmission phase (SS1, SS2 or CA) the value of the next CWND is calculated and be stored in the relevant field of the associated entry in AST 250 and process 300 returns 380 to block 310 for handling the next packet.

In case that the current transmission phase is SS1 then the updated value of CWND is equal twice the old CWND. If the current transmission phase is SS2 then the updated value of CWND can be equal to "M" times the old CWND, wherein "M" is greater than one but smaller than two, 1.2 for example. For such an "M" the updated CWND is equal to 1.2 the old CWND. If the transmission phase is CA, then the updated CWND is equal to the old CWND plus the number of bytes that are defined by the MSS. Thus, the updated CWND is equal to the old CWND+MSS. In some embodiments the CWND may be increased by N times the value of the MSS, wherein N is equal or greater than 1. After calculating 378 and storing the updated CWND, packets that are stored in the relevant MDQm 230a-n (FIG. 2) can be transmitted toward the relevant MD 110 (FIG. 1) based on the updated CWND and the updated transmission phase. Next, process 300 returns 380 to block 310 and waits for a packet.

A person having an ordinary skill in the art can modify the disclosed process 300 to be executed partially by MM 220 instead of MDIPNI 210 (FIG. 2). In an example modified process 300, the MM 220 can be configured to execute actions that are related to calculating new values, actions such as the ones that are disclosed in blocks 344, 354, for example. In addition the MM 220 can be configured to execute actions that are related to comparing values. Actions such as the ones that are disclosed in blocks 360, 370, and 374, for example. In such embodiments, the MDIPNI 210 can execute actions that are related to transmitting and receiving packets. Actions such as the ones that are disclosed by blocks 310 to 354, for example.

Figure 4A:
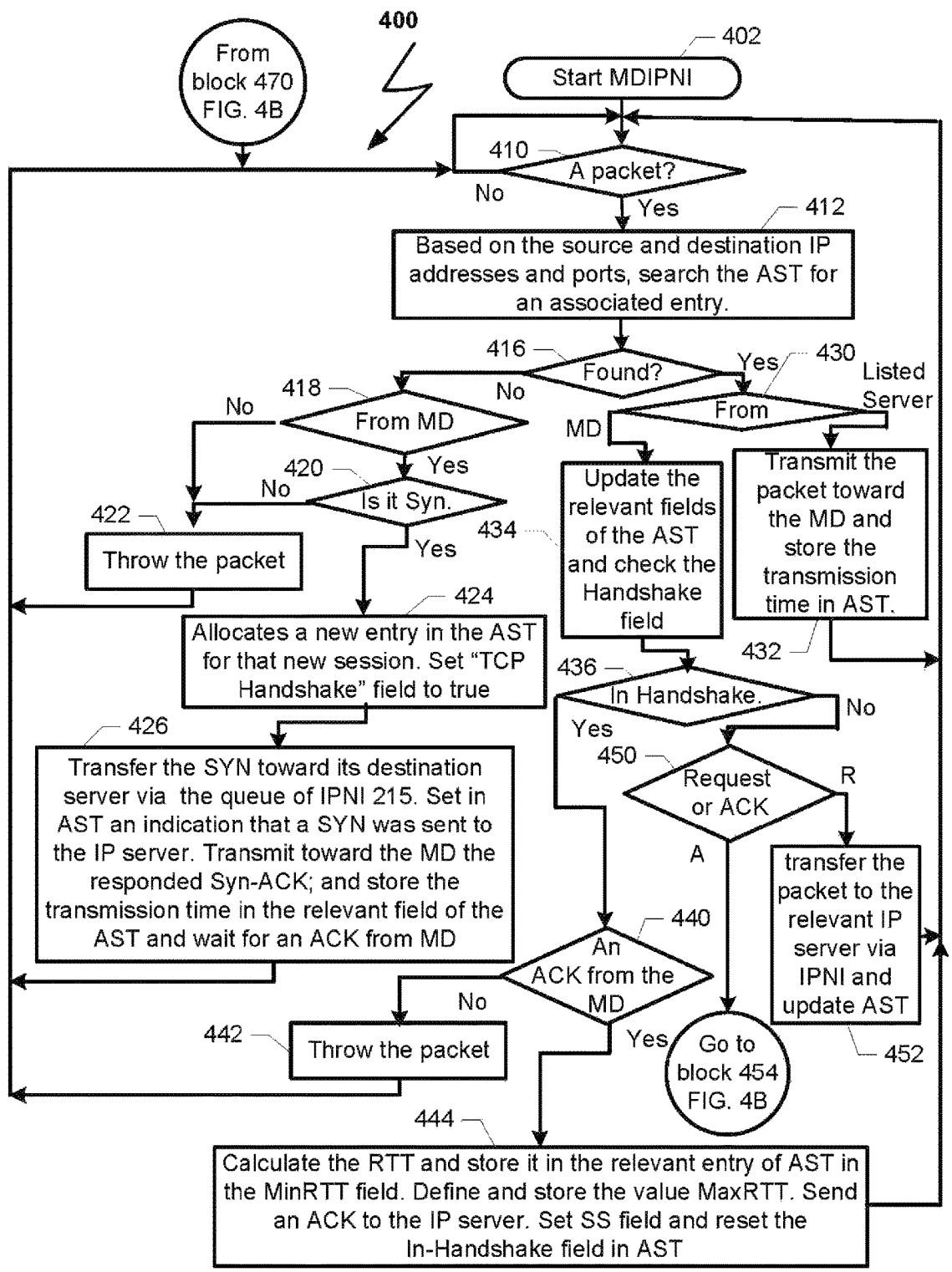
FIGS. 4A and 4B illustrate a flowchart with relevant actions of another example of a process for increasing the TP over a cellular connection that can be implemented by another example of MDIPNI 210 (FIG. 2) of an NE.
Figure 4B:
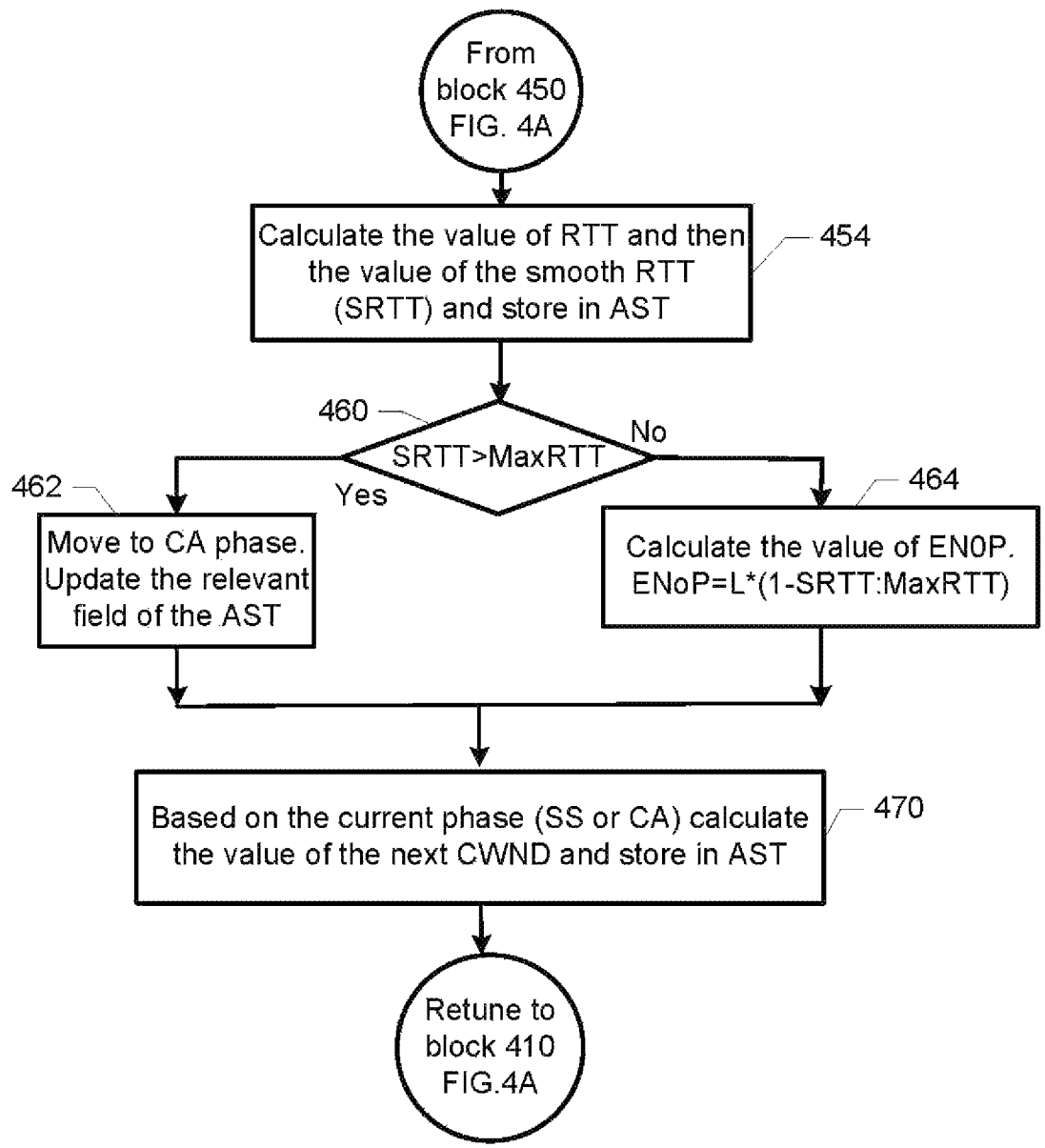

Referring now to FIGS. 4A and 4B that illustrate a flowchart with relevant actions of another example of a process 400 that can be implemented by an example MDIPNI 210 (FIG. 2), of an NE 200, for increasing the TP during a TCP/IP downloaded session from an IP server 150 (FIG. 1) to an MD 110. In general, the example process 400 modifies the way that an example of NE 136 (FIG. 1) increases the value of the CWND during the SS period of the download session.

The process can be initiated 402 after power on and be executed as long as the NE 200 is active. Upon initiation 402 resources for handling the disclosed method can be allocated. Resources such as but not limited to storage resources for the AST 250 and the different queues, timers for monitoring the RTT, registers, computing resources, networking resources, etc. then, process 400 may wait 410 for a packet.

Upon obtaining 410 a packet or a pointer to a packet that is stored in one of the queues MDQs 230a-n (FIG. 2), the header of the packet can be parsed 412 and based on the source and destination IP addresses and ports the AST 250 (FIG. 2) can be searched for an entry that is associated with this session. If 416 an entry was not found, then a decision is made 418 whether the packet was obtained from an MD. If 418 the packet was not obtained from one of the MDs 110 (FIG. 1), then the packet is thrown away 422 and process 400 returns to block 410 waiting for the next packet. If 418 the packet was obtained from one of the MDs 110 (FIG. 1) then at block 420, the packet is parsed and a decision is made whether the packet carries a SYN message. If 420 not, then the packet is thrown away 422 and process 400 returns to block 410 for handling the next packet.

If 420 the packet carries a SYN message, indicating that the relevant MD 110 (FIG. 1) is willing the start a new download session, then at block 424 a new entry in AST 250 is allocated for that new session. The relevant fields of the new entry can be updated with information related to that session. Information such as but not limited to source and destination IP addresses and ports, obtaining time, etc. In addition a field that is associated to "TCP Handshake" can be set to "true", indicating that the relevant MD is in a process for establishing a new TCP session with that IP server.

Next, at block 426 the SYN packet is transferred toward its destination server via the queue of IPNI 215 (FIG. 2) and an indication for sending the SYN packet can be written in the relevant entry in the AST. In addition, a packet that carries a responded SYN-ACK message can be sent 426 toward the relevant MD via MDIPNI 210. The transmission time of sending the SYN-ACK can be stored in the relevant field of the allocated entry in AST 250. In addition, the value of MaxRTT that is related to that session can be written in the relevant field of the new allocated entry in AST 250 and the field of the SS phase is set to true. Then, process 400 returns to block 410 for handling the next packet.

Returning now to block 416. If 416 an entry was found, then in block 430 a decision can be made whether the packet was obtained from one of the MDs 110 (FIG. 1) or whether the packet was obtained from one of the listed IP servers via MM 220 (FIG. 2) or via IPNI 215. The "listed IP servers" is a subgroup from the plurality of IP servers 150 (FIG. 1) that are currently listed in the AST 250 as having an active download session with one of the MDs 110.

If 430 the packet was obtained from one of the listed IP servers 150 (FIG. 1), then the relevant entry in the AST 250 can be updated and the packet is sent 432 toward the relevant MD 110 (FIG. 1), in addition, the transmission time can be stored in the relevant entry in AST. Then, process 400 may return to block 410 waiting to the next packet. The relevant entry in AST 250 can be defined by the source (MDs) and destination (one of the IP servers) IP addresses and IP ports, for example. In some embodiments the entry can be define by a value of a session ID.

If 430 the packet was obtained from one of the MDs 110, then at block 434 the relevant fields of the associated entry of AST 250 (FIG. 2) can be updated and the "TCP-Handshake" field can be checked 434. If 436 the "TCP-Handshake" field is true, indicating that the state of the TCP connection is in "TCP-Handshake" process, then at block 440 a decision is made whether the packet carries an ACK message from the relevant MD. If 440 not, then at block 442 the packet is thrown away and process 400 returns to block 410 for handling the next packet.

If 440, the packet carries an ACK message from the relevant MD, then at block 444 the RTT from the NE 136 to the relevant MD 110 can be calculated and stored in the relevant entry of the AST in the MinRTT field. In addition, the value of the MaxRTT can be written 444 in the relevant field of that entry and the ACK packet can be sent toward the relevant IP server. In addition the SS field can be set to true. Finally, the "In-TCP-Handshake" field in the relevant entry is reset and process 400 returns to block 410 for handling the next packet.

An example embodiment of process 400 can define 444 the value of the MaxRTT by running a plurality of experiments in which the CWND is increased while measuring the RTT. The value of the RTT, above which the values of the RTTs are increased rapidly, can be defined as the MaxRTT. Other embodiments may continue to increase the CWND until a packet lost is detected, and then define the measured RTT, which was measured before the packet lost, as MaxRTT. We found that the value of the MaxRTT can depend on the type of the cellular network 3G, 4G, etc.

If 436 the "TCP-Handshake" field is not true, then a decision is made 450 whether the packet carries a request (R) to be sent toward the relevant IP server or carries an ACK (A) message toward the relevant IP server 150 (FIG. 1). If 450 the packet carries a request, then the request packet is transferred 452 toward the relevant IP server via IPNI 215 (FIG. 2) and the relevant entry in the AST can be updated or released, in case that the packet is the last packet of the session, then process 400 returns to block 410 for handling the next packet. If 450, the packet carries an ACK message, then process 400 proceed to block 454 (FIG. 4B) and calculates the value of RTT as well as the value of SRTT, and then updates 454 the value of the SRTT in the relevant field of that entry in AST 250. Some embodiments may calculate the value of SRTT as an average value based on two or more measured RTTs.

After updating 454 the value of SRTT the updated value is compared 460 to the value of the MaxRTT. If 460 SRTT is greater than the value of MaxRTT, then the phase of the transmission rate can be changed 462 to congestion avoidance (CA) phase. The cell at the junction of the relevant entry of AST 250 (FIG. 2) and the SS column is set to false and the cell at the junction of the relevant entry and the CA phase column is set to true and process 400 proceed to block 470.

If 460 the value of SRTT is not bigger than MaxRTT, which means that the SS phase continues, then at block 464 the value of the amount of Extra-Number-of-Packets (ENoP) that will be added to the CWND, per each received ACK, is calculated. An example embodiment uses the following formula for calculating the ENoP:

$$ENoP=L*(1-SRTT:MaxRTT)$$

We found that the value of L can be in the range of 2-3. An example value of L can be 2.4. At the point of time that the value of ENoP is equal or smaller than zero the sender can switch to CA phase. By using this method an example of NE can increase its CWND by the value of bytes that are carried by the extra number of packets, ENoP. Thus, the value of a new CWND can be equal to the previous CWND plus the number of bytes carried by the ENoP.

From block 462 or block 464 an example embodiment of process 400 can proceed to block 470 and based on the current transmission phase (SS or CA) the value of the next CWND is calculated and be stored in the relevant field of the associated entry in AST 250. After calculating 470 and storing the updated CWND, packets that are stored in the relevant MDQm 230a-n (FIG. 2) can be transmitted toward the relevant MD 110 (FIG. 1) based on the updated CWND and the updated transmission phase. Next, process 400 returns to block 410 for handling the next packet. In SS phase the next CWND can be defined as equal to the previous CWND plus the number of bytes carried by the ENoP. In CA phase a linear growth algorithm can be used. An example of linear-growth algorithm may add a fix amount of bytes per each round-trip time (RTT).

The present disclosure describes few methods that can be implemented by an NE 136 for increasing the TP over a download connection from an IP server 150 toward an MD 110 (FIG. 1). In some example embodiments increasing the TP can be implemented by stretching the SS transmission phase. In other example embodiments increasing the TP is implemented by using a novel coefficient for increasing the CWND which is used in SS. Further, an example embodiment increases the TP over a TCP connection by determining when to switch from SS to CA by measuring the RTT instead of waiting to a packet lost.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Many other ramification and variations are possible within the teaching of the embodiments comprising different combinations of features noted in the described embodiments.

The invention claimed is:

1. A method comprising:
    (a) employing a network element ("NE") that is communicatively coupled between a plurality of mobile devices ("MDs") via a cellular network and a plurality of IP servers via an Internet Protocol (IP) network, wherein a transport protocol is used for transmitting IP packets, and wherein the transport protocol is a Transmission-Control Protocol ("TCP") over IP; and
    (b) configuring the NE to increase a throughput ("TP") of transmitting IP packets over a cellular connection between a particular MD of the plurality of MDs and the NE using the TCP over IP by increasing a time period of a slow-start ("SS") phase over the cellular connection between the particular MD and the NE.

2. The method of claim 1, wherein the action of increasing the time period of the slow-start (SS) phase further comprises increasing a value of a slow-start threshold ("SST").

3. The method of claim 1, wherein the action of increasing the time period of the slow-start (SS) phase further comprises dividing the SS phase into two or more slow-start-sub-phases.

4. The method of claim 3, wherein during a first slow-start-sub phase, the NE is configured to use the value of two as an exponential coefficient for increasing the value of a used congestion window ("CWND").

5. The method of claim 3, wherein during a second slow-start-sub-phase the NE is configured to use a value that is bigger than one but smaller than two as the exponential coefficient for increasing the value of a used congestion window ("CWND").

6. The method of claim 3, wherein during a second slow-start-sub-phase the NE is configured to use the value of 1.5 as the exponential coefficient for increasing the value of a used congestion window ("CWND").

7. The method of claim 3, wherein the action of configuring the NE to increase the throughput ("TP") of transmitting IP packets over the cellular connection between the particular MD and the NE using the TCP over IP further comprises measuring two or more time periods.

8. The method of claim 7, wherein one of the two or more time periods is a minimum round-trip-time ("RTT") ("MinRTT") period measured by the NE during a process of establishing the cellular connection between the particular MD and the NE, and wherein another of the two or more time periods is a maximum RTT ("MaxRTT") period.

9. The method of claim 8, wherein the MaxRTT is the value of the RTT above which a packet lost is detected over the cellular connection between the MD and the NE.

10. The method of claim 8, wherein the MaxRTT is the value of the RTT, above which the values of the following RTTs are increased rapidly.

11. The method of claim 8, further comprising defining a value in time of a pivot-point (PP) in which the NE is configured to switch from the first slow-start-sub-phase to the second slow-start-sub-phase.

12. The method of claim 11, wherein the value in time of the PP is calculated by the formula PP=MaxRTT*(1−MinRTT:K), where MinRTT:K is a portion of the MinRTT divided by a factor K, wherein K depends on the type of a cellular network over which the cellular connection between the MD and the NE is established.

13. The method of claim 12, wherein the factor K is in the range between 30 milliseconds and 90 milliseconds.

14. A method comprising:
(a) employing, a network element (NE) that is communicatively coupled between a plurality of mobile devices (MDs) via a cellular network and a plurality of IP servers via an Internet Protocol (IP) network;
(b) configuring the NE to increase a throughput ("TP") of transmitting IP packets over a cellular connection between a particular MD of the plurality of MDs and the NE by increasing the CWND per each ACK during a slow-start ("SS") phase by adding an extra number of bytes that are embedded in an extra-number-of-packets ("ENoP"), wherein the value of the ENoP is calculated by the formula EnoP=L*(1−current RTT:MaxRTT), where RTT:MaxRTT is the value of RTT divided by the value of MaxRTT, wherein MaxRTT is the value of the RTT, (a) above which a packet lost is detected over the cellular connection between the particular MD and the NE or (b) above which the values of the following RTTs are increased rapidly, and the factor L is in the range of 2-3.

15. The method of claim 14, wherein the NE is configured to switch from a slow-start phase to a congestion avoidance (CA) phase when the value of the ENoP is equal to or less than zero.

16. A computer readable medium containing executable instructions that when executed cause a processor, at a network element ("NE"), wherein the NE is communicatively coupled between a plurality of mobile-devices ("MDs") over a cellular network and a plurality of IP servers over an IP network, increases the throughput ("TP") of IP packets transmission over a cellular connection between a particular MD of the plurality of MDs and the NE by dividing a slow-start phase into two or more slow-start-sub-phases.

17. The computer readable medium of claim 16, wherein the instructions, when executed cause the processor, at the network element (NE), increases the TP by measuring two or more time periods.

18. The computer readable medium of claim 17, wherein one of the two or more time periods is a minimum round-trip time ("RTT") ("MinRTT") measured by the NE during a process of establishing the cellular connection between the particular MD and the NE, and wherein another of the two or more time periods is a maximum RTT ("MaxRTT") period.

19. The computer readable medium of claim 18, wherein the MaxRTT is the value of the RTT measured by the NE above which a packet lost is detected.

20. A network element ("NE") that is communicatively coupled between a plurality of mobile devices ("MDs") via a cellular network and a plurality of Internet Protocol ("IP") servers via an IP network, the NE comprising:
a. a manager logical module ("MM");
b. an active session table ("AST"), which is stored in a memory device;
c. one or more queues, embedded in one or more memory devices;
d. an IP network interface logical module ("IPNI");
e. an MD IP network interface ("MDIPNI"); and
f. wherein the MM and the MDIPNI are configured to increase a throughput ("TP") of Transmission-Control Protocol ("TCP")/IP packets transmitted over a cellular connection between a particular MD of the plurality of MDs and the NE by increasing the CWND per each ACK by adding an extra number of bytes that are embedded in extra-number-of-packets (ENoP).

21. The NE of claim 20, wherein the cellular network is a Long-Term Evaluation ("LTE") cellular network.

22. The NE of claim 20, wherein the MM and the MDIPNI are configured to increase the TP of IP packets transmitted over the cellular connection between the particular MD and the NE by measuring two or more time periods.

23. The NE of claim 22, wherein one of the two or more time periods is a minimum round-trip-time ("RTT") ("MinRTT") period measured by the NE during a process of establishing the cellular connection between the particular MD and the NE, and wherein another time period of the two or more time periods is a maximum RTT ("MaxRTT") period.

24. The NE of claim 23, wherein the value of the MaxRTT is the value of the RTT measured by the NE above which a packet lost over the cellular connection between the particular MD and the NE is detected.

25. The NE of claim 23, wherein the value of the MaxRTT is the value of the RTT, above which the values of the following RTTs are increased rapidly.

26. The NE of claim 24, wherein the value of the ENoP is calculated by the formula ENop=L*(1−current RTT:MaxRTT), where RTT:MaxRTT is the value of RTT divided by the value of MaxRTT and the factor L is in the range of 2-3.

* * * * *